United States Patent [19]
McKee et al.

[11] Patent Number: 5,915,114
[45] Date of Patent: Jun. 22, 1999

[54] DYNAMIC TRACE DRIVEN OBJECT CODE OPTIMIZER

[75] Inventors: Bret A. McKee; Blaine D. Gaither, both of Ft. Collins, Colo.

[73] Assignee: Hewlett-Packard Company, Palo Alto, Calif.

[21] Appl. No.: 08/799,950

[22] Filed: Feb. 14, 1997

[51] Int. Cl.$^6$ .................................................. G06F 11/00
[52] U.S. Cl. ..................... 395/704; 395/183.21; 395/377
[58] Field of Search ..................... 395/704, 705, 395/709, 183.11, 183.15, 183.14, 183.21, 184.01

[56] References Cited

U.S. PATENT DOCUMENTS

| | | | |
|---|---|---|---|
| 3,707,725 | 12/1972 | Dellheim | 395/183.14 |
| 5,297,274 | 3/1994 | Jackson | 395/500 |
| 5,530,964 | 6/1996 | Alpert et al. | 395/709 |
| 5,533,192 | 7/1996 | Hawley et al. | 395/183.04 |
| 5,632,032 | 5/1997 | Ault et al. | 395/670 |
| 5,642,478 | 6/1997 | Chen et al. | 395/183.21 |
| 5,689,712 | 11/1997 | Heisch | 395/704 |
| 5,764,885 | 6/1998 | Sites et al. | 395/183.21 |
| 5,802,272 | 9/1998 | Sites et al. | 395/183.21 |
| 5,805,863 | 9/1998 | Chang | 395/500 |

FOREIGN PATENT DOCUMENTS 0 810 523 A2  3/1997  European Pat. Off. .......... G06F 9/45

*Primary Examiner*—James P. Trammell
*Assistant Examiner*—Demetra R. Smith

[57] ABSTRACT

A dynamic trace-driven object code optimizer provides for dynamic, real-time optimization of executable object code. The dynamic trace-driven object code optimizer bases the real-time optimization of executable object code on data gathered from execution traces collected in real-time. The executable code is then modified in real-time to generate optimized object code that is able to run more quickly and efficiently on the current system.

37 Claims, 1 Drawing Sheet

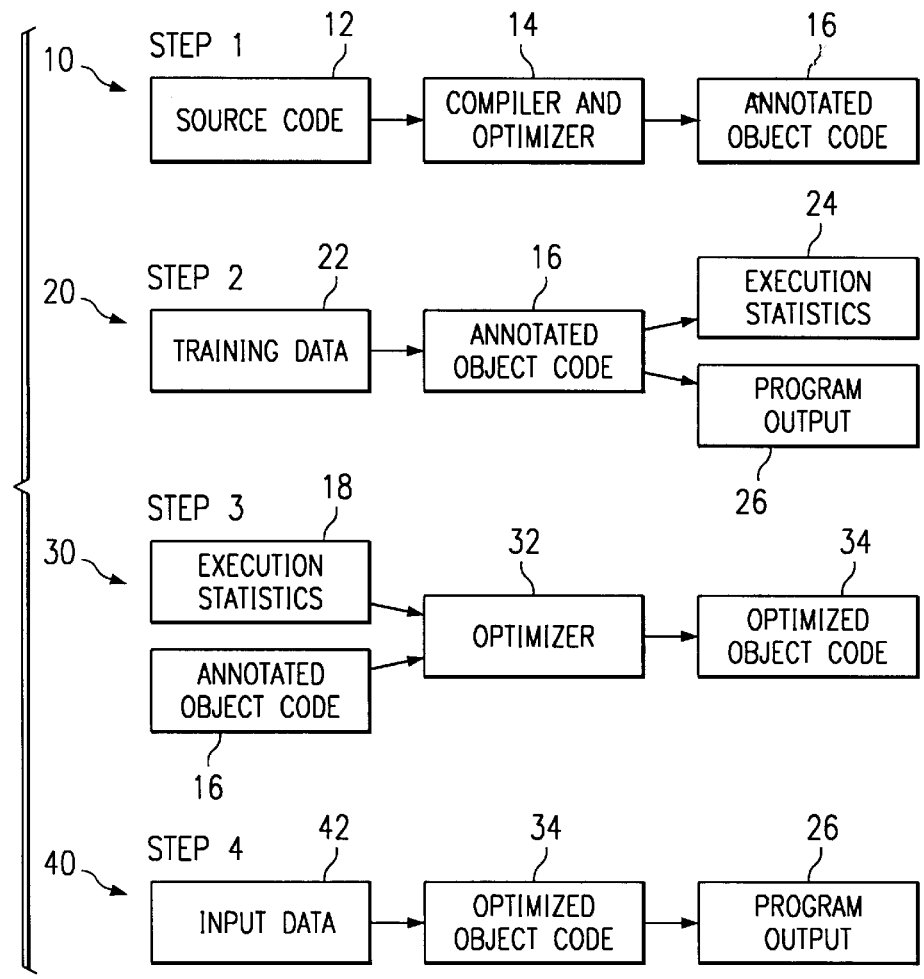
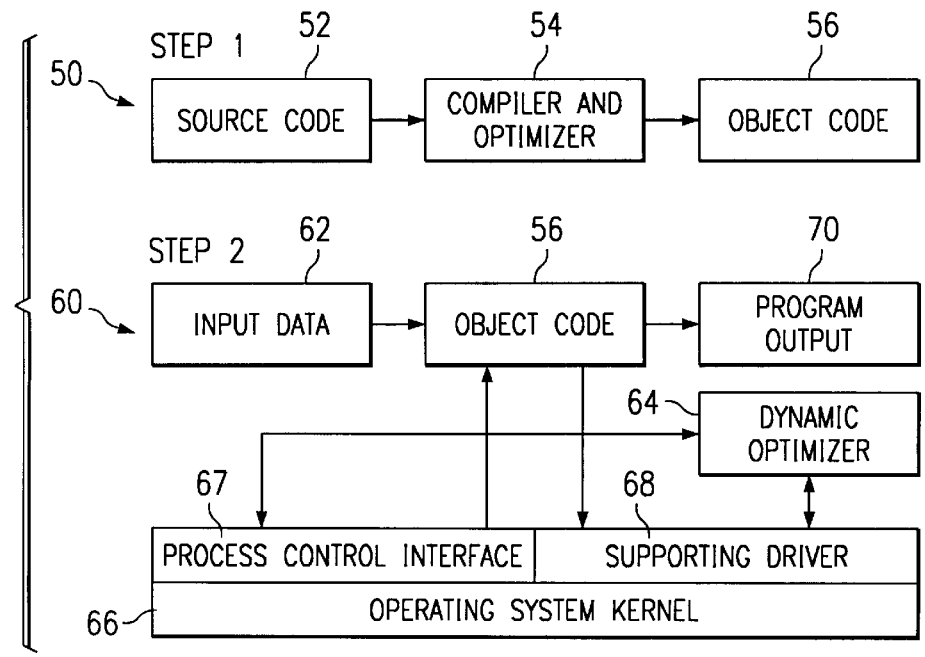
FIG. 1 (PRIOR ART)
FIG. 2

DYNAMIC TRACE DRIVEN OBJECT CODE OPTIMIZER

FIELD OF THE INVENTION

This invention relates generally to the optimization of object code, and more particularly to optimization of object code in real-time during execution of the object code.

BACKGROUND OF THE INVENTION

Modern optimizers use feedback-directed optimization to provide for the generation of better object code. The object code being optimized is generated, is executed using training data, and then is re-generated using information gathered during execution of the object code with the training data in order to optimize the object code for that particular training data. Feedback-directed optimization increases the performance of generated object code by providing the compiler with information concerning the type of data, the training data, that will be processed by the code.

FIG. 1 illustrates the process of feedback-directed optimization used to optimize an object code program, according to the prior art. The first step 10 is to compile the program with instrumentation. Source code 12 is compiled by compiler and optimizer instrumentation 14 to generate annotated object code 16. The second step 20 is to run the program with the training input data. Annotated object code 16 is run with training data 22 to generate execution statistics 24 and program output 26 for the program run with particular training data. The third step 30 is to optimize the program based upon the generated execution statistics. The execution statistics 24 generated in step 2 and the annotated object code 16 generated by step 1 are used by the optimizer 32 to generate optimized object code 34. The fourth step 40 is to execute the program with actual, rather than test, input data. The optimized object code 34 generated in step 3 is executed with the actual input data 42 to generate optimized program output 26'.

It must be noted that if the actual input data 42 used in step 4 differs significantly from the training data 22 used in step 2, optimization of the object code will be impeded and performance of the executed object code will correspondingly suffer. The closer the training data 22 is to the actual data 42 the better the optimized object code 34 will be. Thus, the success of the feedback-directed optimization depends in large part on the quality of test data used to generate execution statistics.

The feedback-directed optimization of the prior art has several shortcomings. First, as discussed above, the optimized object code 34 is optimized only for specific test data 22 that may be representative of a particular revision of a specific processor architecture and revision level. If the optimized object code 34 is later run on a different processor architecture or a different revision level, it will no longer be optimized object code for the different architecture or revision level. There is therefore an unmet need in the art to be able to be able to easily and readily optimize object code that may be run on different processor architectures and revision levels as required.

Second, the optimized object code 34 is generated based upon given training data 22 and is therefore optimized for that particular training data 22. If there are data sets which the program may be expected to execute that are substantially different from the training data, the object code generated will be non-optimal. This, of course, indicates that it would always be preferable to use training data 22 that matched or at least closely resembled the actual data 22 to be used with the object code.

Given pragmatic considerations, however, the actual data will not always be available to serve as the training data 22 for the feedback-directed optimization method of the prior art. Due to confidentiality concerns, software vendors are generally unwilling to make the source code of their software applications available, and their customers are likewise unwilling to provide proprietary data to the software vendors for use as training data. In situations such as this, the final executable object code provided to the customer has not been trained on the customer's data and is therefore not optimized object code. There is therefore an unmet need in the art to be able to generate optimized object code without the need for using training data to do so.

Third, the feedback-directed optimization method of the prior art requires access to the program source code. As mentioned previously, software vendors are understandably reluctant to make the source code of their software applications available and thus feedback-directed optimization may not be a feasible option for object code optimization. There is therefore an unmet need in the art to be able to generate optimized object code even where there is no access to the program source code.

Fourth, optimization of executable object code using the feedback-directed optimization method is a static approach that occurs when the optimized object code is generated and before the optimized object code is even run with actual data. Due to the static nature of the optimization using the feedback-directed method, the object code is not capable of being dynamically optimized in real-time as the program itself is executing the object code. Dynamic optimization of object code during execution of the program provides the obvious advantage of ensuring that the program is optimized for the actual data being run, even if the data changes. There is therefore another unmet need in the art to be able to dynamically optimize object code of a program in real-time as the program is being executed.

Fifth, the complexity associated with the multi-stage process build required for feedback-directed optimizations is a cumbersome approach that discourages potential users from using it. As shown in FIG. 1, the feedback-directed optimization of the prior art requires four separate steps in order to run a program with optimized object code. These steps must be performed and supervised by the user. Further, as discussed above, even after performing all of these steps, there is no guarantee that the optimized object code that is generated will in fact be optimal for actual data to be run with the program. There is an unmet need in the art to be able to able to optimize object code with minimal complexity and supervision required of the user of the program.

SUMMARY OF THE INVENTION

It is therefore an object of the present invention to be able to easily and readily optimize object code that may be run on different processor architectures and revision levels as required.

It is further an object of the present invention to be able to generate optimized object code without the need for using training data.

It is still a further object of the present invention to be able to generate optimized object code where there is no access to the program source code.

It is another object of the present invention to be able to dynamically optimize object code of a program in real-time as the program is being executed.

It is yet a further object of the present invention to be able to optimize object code with minimal complexity and supervision required of the user of the program.

Therefore, according to the present invention, a dynamic trace-driven object code optimizer provides for dynamic, real-time optimization of executable object code. The dynamic trace-driven object code optimizer bases the real-time optimization of executable object code on data gathered from execution traces collected in real-time. Runtime data about the execution paths the program is following is gathered as the program is being run. The object code being executed is analyzed for non-optimal instruction streams. The executable code is then modified in real-time to generate optimized object code that is able to run more quickly and efficiently with the actual data being run on the current system configuration.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawings, wherein:

FIG. 1 illustrates the process of feedback-directed optimization used to optimize an object code program, according to the prior art; and FIG. 2, illustrates the process used to optimize a program using a dynamic trace driven optimizer, according to the present invention.

DESCRIPTION OF THE INVENTION

The present invention provides an optimization method that provides for dynamic, real-time optimization of executable object code. The dynamic trace-driven object code optimizer of the present invention bases the real-time optimization of executable object code on data gathered from execution traces collected in real-time. The executable code is then modified in real-time to generate optimized object code that is able to run more quickly and efficiently on the current system using actual data.

The dynamic trace-driven code optimizer gathers runtime data about the execution paths the program is following as the program is being run. It then analyzes the code being executed for non-optimal instruction streams and modifies the code in real-time in order to generate optimized object code that is capable of enhanced performance for the given data being run with the program.

FIG. 2 illustrates the process used according to the dynamic trace-driven object code optimizer of the present invention to dynamically optimize a program object code in real-time during program execution. A two step process for the object code optimization according to the present invention will now be described. The first step 50 is to compile the source code to object code. As shown in Step 1, the source code 52 of the program to be optimized is compiled through use of a compiler and optimizer 54 to produce object code 56. Once the object code 56 is obtained it is no longer necessary to repeat first step 50. Thus, if a customer purchases the object code from a software vendor the customer does not have to perform step one at all.

The second step 60 is to execute the compiled object code using actual input data. As shown in Step 2, the object code 56 is run with input data 62 to generate program output 70. The dynamic optimizer 64 communicates with the process control interface 67 and supporting driver 68 of operating system kernel 66 to optimize the object code 56. Optimization of object code 56 obviously effects the run-time of the program in a positive way since optimization makes the object code more efficient and thus faster.

Process control interface 67 provides the means for debugging the object code. It has the ability to stop execution of the program and modify the object code in real-time in order to accomplish the debugging function. Process control interface 67 may be any variety of interfaces that accomplish this function. For instance, process control interface 67 may be a ptrace interface of the type used in UNIX systems. Supporting driver 68 is responsible for gathering in real-time the execution traces of the program. The execution traces provide information about the execution paths the program is following.

It must be noted that the activity of second steps occurs in real-time during execution of the program itself. Thus, the optimization of the object code 56 by dynamic optimizer 64 is dynamic in nature and is adapted to dynamically adapt the object code to any changes in input data 62 that may occur during execution of the program.

Depending upon the configuration of the dynamic optimizer, it can be configured to periodically trace the execution of any processes running on the system and automatically optimize it, or it can be started with information necessary to find a specific program which is to be optimized. For instance, the dynamic trace-driven object code optimizer may be incorporated into the operating system of a computer, so that object code optimization occurs automatically upon power-up and upon execution of any program initiated by the user, unbeknownst to the user. In any case, as the target program executes data about its execution is gathered and its object code is modified to enable the target program to run more quickly and efficiently.

As an example, consider the use of the dynamic trace-driven object code optimizer in a system in which the prediction of object code branches may be easily ascertained as a function of the processor architecture. The present invention provides for the prediction of branches to be changed very easily based upon information gathered from real-time execution traces. Any object code sequence having a faster executing "synonym" than a portion of the executing code may be easily and safely optimize and then inserted in place of the portion of executing code.

The dynamic trace-driven object code optimizer of the present invention provides significant advantages over the prior art feedback-directed optimizer. First, the present invention allows object code that may be run on different processor architectures and revision levels to be easily and readily optimized as required. This is because optimization of the object code takes into account the current data set being executed with the code. Second, optimized object code is generated without the need for using training data. Again, this is because the optimization procedure is conducted using the actual data set. Elimination of the need for training data eliminates a time-consuming step of the prior art feedback-directed optimizer.

Third, the dynamic trace-driven object code optimizer of the present invention is able to generate optimized object code where there is no access to the program source code. This is because optimization occurs in real-time based upon execution traces gathered of the object code as it is being executed. The optimization of object code occurs dynamically during execution of the program and the object code may be continuously optimized in response to changes in the actual data being run with the program. Because source code is not required, optimization may be used on proprietary code as well as on code for which the source code is not readily available.

Fourth, the present invention dynamically optimizes the object code of a program in real-time as the program is being executed. The object code may be continuously optimized as required in response to changing data set conditions. The dynamic nature of the collection of information through execution traces ensures that the dynamic trace-driven object code optimizer continuously examines the object code as it is being executed. Additionally, the dynamic trace-drive object code optimizer of the present invention allows portions of object code to be re-optimized during a program's execution, thereby allowing programs that execute in phases to be continuously updated and optimized.

Fifth, the present invention provides a method for optimization of object code with minimal complexity and supervision required of the user of the program. Unlike the four step process of the feedback-directed optimizer of the prior art, the dynamic trace-driven object code optimizer of the present invention readily and easily provides for optimization of object code without the need for source code and without the need for supervision of the process by the user. As previously discussed, the optimizer of the present invention may be embedded in RAM so that it is quite transparent to the user.

While the invention has been particularly shown and described with reference to a preferred embodiment, it will be understood by those skilled in the art that various changes in form and detail may be made therein without departing from the spirit and scope of the invention.

What is claimed is:

1. A process for dynamically optimizing object code of a program in real-time during execution of the program, comprising the computer-implemented steps of:
    gathering execution traces on the object code as the program is being executed;
    analyzing the execution traces to identify one or more non-optimal instruction streams of the object code, wherein the one or more non-optimal instruction streams of the object code are determined by the data set being executed by the program; and
    modifying the object code as the program is being executed, by inserting optimized object code into the program in place of the one or more non-optimal instruction streams, to optimize the one or more non-optimal instruction streams for the data set being executed by the program to generate optimized object code.

2. The process of claim 1, wherein the step of gathering execution traces on the object code as the program is being executed is accomplished by a driver of an operating system that is executing the program.

3. The process of claim 1, wherein the step of analyzing the execution traces to identify one or more non-optimal instruction streams of the object code is accomplished by a process control interface of an operating system that is executing the program.

4. The process of claim 3, wherein the process control interface allows the object code to be debugged in order to identify non-optimal instruction streams of the object code.

5. The process of claim 4, wherein the operating system is a UNIX operating system and the process control interface is a ptrace interface.

6. The process of claim 1, wherein the step of modifying the object code to optimize the one or more non-optimal instruction streams is accomplished by a dynamic trace-driven object code optimizer.

7. The process of claim 1, wherein after the step of modifying the object code to optimize the one or more non-optimal instruction streams to generate optimized object code, comprising the further step of:
    saving the optimized object code.

8. The process of claim 1, wherein after the step or modifying the object code as the program is being executed to generate optimized object code, comprising the further steps of:
    periodically gathering execution traces on the optimized object code as the program is being executed;
    periodically analyzing the execution traces to identify one or more non-optimal instruction streams of the optimized object code, wherein the one or more non-optimal instruction streams of the optimized object code are determined by the data set being executed by the program; and
    modifying the optimized object code as the program is being executed as necessary to optimize the one or more non-optimal instruction streams for the data set being executed by the program in order to generate re-optimized object code.

9. The process of claim 1, wherein optimization of the object code of the program occurs automatically without requiring supervision by a user of the program.

10. The process of claim 1, wherein a portion of the object code is modified as the program is being executed to optimize the one or more non-optimal instruction streams for the data set being executed by the program to generate optimized object code.

11. A process for dynamically optimizing object code of a program in real-time during execution of the program, comprising the computer-implemented steps of:
    gathering execution traces on the object code as the program is being executed;
    analyzing the execution traces to identify one or more non-optimal instruction streams of the object code, wherein the one or more non-optimal instruction streams of the object code are determined by the data set being executed by the program; and
    modifying a portion of the object code as the program is being executed by inserting an optimized portion of obiect code into the program in place of the one or more non-optimal instruction streams, to optimize the one or more non-optimal instruction streams for the data set being executed by the program to generate optimized object code.

12. The process of claim 11, wherein the step of fathering execution traces on the object code as the program is being executed is accomplished by a driver of an operating system that is executing the program.

13. The process of claim 11, wherein the step of analyzing the execution traces to identify the one or more non-optimal instruction streams of the object code is accomplished by a process control interface of an operating system that is executing the program.

14. The process of claim 13, wherein the process control interface allows the object code to be debugged in order to identify the one or more non-optimal instruction streams of the object code.

15. The process of claim 14, wherein the operating system is a UNIX operating system and the process control interface is a ptrace interface.

16. The process of claim 11, wherein the step of modifying a portion of the object code to optimize the one or more non-optimal instruction streams is accomplished by a dynamic trace-driven object code optimizer.

17. The process of claim 11, wherein after the step of modifying a portion of the object code as the program is being executed to generate optimized object code, comprising the further steps of:

periodically gathering execution traces on the optimized object code as the program is being executed;

periodically analyzing the execution traces to identify one or more non-optimal instruction streams of the optimized object code, wherein the one or more non-optimal instruction streams of the optimized object code are determined by the data set being executed by the program; and modifying at least a portion of the optimized object code as the program is being executed as necessary to optimize the one or more non-optimal instruction streams for the data set being executed by the program in order to generate re-optimized object code.

18. The process of claim 11, wherein after the step of modifying the object code to optimize the one or more non-optimal instruction streams to generate optimized object code, comprising the further step of:

saving the optimized object code.

19. The process of claim 11, wherein optimization of a portion of the object code of the program occurs automatically without requiring supervision by a user of the program.

20. A storage media containing a computer program for dynamically optimizing object code in real-time during execution of the object code, comprising:

instructions for gathering execution traces on the object code as the program is being executed;

instructions for analyzing the execution traces to identify one or more non-optimal instruction streams of the object code, wherein the one or more non-optimal instruction streams of the object code are determined by the data set being executed by the program; and instructions for modifying the object code as the program is being executed by inserting optimized object code into the program in place of the one or more non-optimal instruction streams, to optimize the one or more non-optimal instruction streams for the data set being executed by the program to generate optimized object code.

21. The media of claim 20, wherein the instructions for gathering execution traces on the object code as the program is being executed are accomplished by a driver of an operating system that is executing the program.

22. The media of claim 20, wherein the instructions for analyzing the execution traces to identify one or more non-optimal instruction streams of the object code are accomplished by a process control interface of an operating system that is executing the program.

23. The media of claim 22, wherein the process control interface allows the object code to be debugged in order to identify non-optimal instruction streams of the object code.

24. The media of claim 23, wherein the operating system is a UNIX operating system and the process control interface is a ptrace interface.

25. The media of claim 20, wherein the instructions for modifying the object code to optimize the one or more non-optimal instruction streams are accomplished by a dynamic trace-driven object code optimizer.

26. The media of claim 20, wherein after the instructions for modifying the object code to optimize the one or more non-optimal instruction streams to generate optimized object code, comprising the further instructions of:

instructions for saving the optimized object code.

27. The media of claim 20, wherein after the instruction for modifying the object code as the program is being executed to generate optimized object code, comprising the instructions of:

instructions for periodically gathering execution traces on the optimized object code as the program is being executed;

instructions for periodically analyzing the execution traces to identify one or more non-optimal instruction streams of the optimized object code, wherein the one or more non-optimal instruction streams of the optimized object code are determined by the data set being executed by the program; and instructions for modifying the optimized object code as the program is being executed as necessary to optimize the one or more non-optimal instruction streams for the data set being executed by the program in order to generate re-optimized object code.

28. The media of claim 20, wherein optimization of the object code of the program occurs automatically without requiring supervision by a user of the program.

29. A storage media containing a computer program for dynamically optimizing object code in real-time during execution of the object code, comprising the computer-implemented steps of:

instructions for gathering execution traces on the object code as the program is being executed;

instructions for analyzing the execution traces to identify one or more non-optimal instruction streams of the object code, wherein the one or more non-optimal instruction streams of the object code are determined by the data set being executed by the program; and instructions for modifying a portion of the object code as the program is being executed, by inserting an optimized portion of object code into the program in place of the one or more non-optimal instruction streams, to optimize the one or more non-optimal instruction streams for the data set being executed by the program to generate optimized object code.

30. The media of claim 29, wherein the instructions for gathering execution traces on the object code as the program is being executed are accomplished by a driver of an operating system that is executing the program.

31. The media of claim 29, wherein the instructions for analyzing the execution traces to identify the one or more non-optimal instruction streams of the object code are accomplished by a process control interface of an operating system that is executing the program.

32. The media of claim 31, wherein the process control interface allows the object code to be debugged in order to identify the one or more non-optimal instruction streams of the object code.

33. The media of claim 32, wherein the operating system is a UNIX operating system and the process control interface is a ptrace interface.

34. The media of claim 29, wherein the instructions for modifying a portion of the object code to optimize the one or more non-optimal instruction streams are accomplished by a dynamic trace-driven object code optimizer.

35. The media of claim 29, wherein after the instructions for modifying a portion of the object code as the program is being executed to generate optimized object code, comprising the further instructions of:

instructions for periodically gathering execution traces on the optimized object code as the program is being executed;

instructions for periodically analyzing the execution traces to identify one or more non-optimal instruction streams of the optimized object code, wherein the one or more non-optimal instruction streams of the optimized object code are determined by the data set being executed by the program; and instructions for modifying at least a portion of the optimized object code as the program is being executed as necessary to optimize the one or more non-optimal instruction streams for the data set being executed by the program in order to generate re-optimized object code.

36. The media of claim 29, wherein after the instructions for modifying the object code to optimize the one or more non-optimal instruction streams to generate optimized object code, comprising the further instructions of:

instructions for saving the optimized object code.

37. The media of claim 29, wherein optimization of a portion of the object code of the program occurs automatically without requiring supervision by a user of the program.

* * * * *

UNITED STATES PATENT AND TRADEMARK OFFICE
CERTIFICATE OF CORRECTION

PATENT NO. : 5,915,114
DATED : June 22, 1999
INVENTOR(S) : JBret A. McKee et al.

Page 1 of 1

It is certified that error appears in the above-identified patent and that said Letters Patent is hereby corrected as shown below:

Column 4,
Line 15, delete "steps" and insert therefor -- step 60 --

Column 6,
Line 45, delete "object" and insert therefor -- object --

Signed and Sealed this

Eleventh Day of June, 2002

*Attest:*

JAMES E. ROGAN
*Attesting Officer*  *Director of the United States Patent and Trademark Office*